United States Patent [19]

Eve

[11] Patent Number: 5,148,679
[45] Date of Patent: Sep. 22, 1992

[54] PORTABLE DEVICE FOR PRODUCING SOLID CARBON DIOXIDE

[75] Inventor: Christopher F. Eve, Washington, D.C.

[73] Assignee: The United States of America as represented by the Department of Health and Human Services, Washington, D.C.

[21] Appl. No.: 757,366

[22] Filed: Sep. 10, 1991

[51] Int. Cl.$^5$ ............................................. F25J 1/00
[52] U.S. Cl. ........................................ 62/10; 62/12; 62/35
[58] Field of Search ............................ 62/10, 12, 35

[56] References Cited

U.S. PATENT DOCUMENTS

| | | | |
|---|---|---|---|
| 1,949,179 | 2/1934 | Pierce | 62/10 |
| 1,981,676 | 11/1934 | Stapp | 62/10 |
| 2,307,013 | 1/1943 | Batzle | 62/10 |
| 3,886,733 | 6/1975 | Connell | 62/50.2 |
| 3,901,044 | 8/1975 | Vahl | 62/10 |
| 4,374,658 | 2/1983 | Kawaguchi | 62/35 |
| 4,640,460 | 2/1987 | Franklin, Jr. | 239/2.2 |

FOREIGN PATENT DOCUMENTS 579306  5/1930  Fed. Rep. of Germany.
56-17916  7/1979  Japan.
54-66395  7/1979  Japan.

Primary Examiner—Ronald C. Capossela
Attorney, Agent, or Firm—Lowe, Price, LeBlanc & Becker

[57] ABSTRACT

A compact, inexpensive and light-weight apparatus, for quick connection to a standard supply of liquid carbon dioxide at room temperature, includes a stiff length of tubing quickly connectable to the source of liquid carbon dioxide. This tube, in a preferred embodiment of the invention, provides all the support needed for the rest of the apparatus, which includes a manual control valve to regulate a flow of the liquid carbon dioxide, a heat exchange coil across which heat transfer takes place to cool the flow of liquid carbon dioxide, an expansion nozzle and a foraminous bag attached to the outlet of the expansion nozzle. An insulation cover is provided to surround the foraminous bag and heat exchange coil and to allow passage of gases therethrough. A portion of the liquid carbon dioxide which expands through the expansion nozzle is immediately converted into solid carbon dioxide collected at the bottom of the foraminous bag, while the rest of the liquid carbon dioxide evaporates into gaseous carbon dioxide which flows out of the foraminous bag to atmosphere. Many of the components of the apparatus are conveniently made of plastics materials for durability and low weight.

18 Claims, 1 Drawing Sheet

PORTABLE DEVICE FOR PRODUCING SOLID CARBON DIOXIDE

FIELD OF THE INVENTION

This invention relates to the production of solid carbon dioxide from liquid carbon dioxide, and more particularly to a light-weight, portable apparatus readily connectable to a source of liquid carbon dioxide for the rapid production of solid carbon dioxide therefrom.

BACKGROUND OF THE PRIOR ART

Numerous forms of apparatus for producing solid carbon dioxide from compressed and cooled carbon dioxide gas and/or liquid carbon dioxide are known. Such apparatus typically comprises substantial units intended to produce relatively large amounts of solid carbon dioxide, sometimes in tightly packed blocks of dry ice.

U.S. Pat. No. 1,949,179 to Pierce, teaches the provision of liquid carbon dioxide through two tubes depending downwardly inside a foraminous bag through which expanding carbon dioxide gas percolates into a surrounding chamber. The liquid carbon dioxide enters the chamber and is passed through a helical coil surrounding the foraminous bag to be cooled by the expanding carbon dioxide gas leaving the foraminous bag. The carbon dioxide is expanded upon entry close to the bottom of the bag and is collected into a cylinder and piston arrangement by which a user may compact the dry ice snow into a solid block. U.S. Pat. No. 1,981,676, to Stapp is another example of a device of this general type.

U.S. Patent No. 2,307,013, to Batzle, on the other hand, teaches a compact apparatus and a method for producing relatively small bodies of carbon dioxide ice formed into predetermined shapes. A sealed capsule of liquid carbon dioxide is punctured in a way that causes the contents to expand into a chamber against a sliding, spring-biased piston having a cavity formed therein. The expanding liquid carbon dioxide is partially formed into snow to fill the cavity in the piston and to exert a force against the spring to obtain compaction of the resulting dry ice, while a portion of the expanded liquid carbon dioxide escapes past the piston as a gas.

Liquid carbon dioxide is usually stored at about room temperature in a conventional cylinder having an outlet valve and a pressure gauge. Since ideal thermodynamic processes are not realizable, a significant portion of the liquid carbon dioxide turns into cold carbon dioxide gas in the known types of apparatus. This gaseous carbon dioxide is either retrieved and recompressed or allowed to escape to atmosphere. Thus, only a relatively small fraction of the original liquid carbon dioxide is converted into dry ice. It is known to flow the incoming liquid carbon dioxide to its point of expansion through tubes which are cooled by the escaping cold carbon dioxide gas as the process proceeds, e.g., is taught by Pierce, mentioned earlier. Hitherto, however, such counter-flow of the incoming liquid carbon dioxide at room temperature and the escaping cold carbon dioxide gas escaping to atmosphere is usually obtained by simple helical coils which are relatively inefficient, expensive, large and heavy.

A need, therefore, exists for an inexpensive, light-weight, highly portable device that may be readily connected to a source of liquid carbon dioxide at room temperature and, within at most a matter of one or two minutes, efficiently convert small amounts of the liquid carbon dioxide into solid carbon dioxide. Such an apparatus should greatly facilitate inexpensive formation and use of solid carbon dioxide wherever liquid carbon dioxide is available.

SUMMARY OF THE INVENTION

Accordingly, it is a principal object of the present invention to provide a simple, inexpensive, light-weight, highly portable apparatus that is readily connectable to a conventional cylinder of liquid carbon dioxide to quickly form therefrom small quantities of solid carbon dioxide.

A related object of this invention is to provide relatively inexpensive and portable apparatus for quickly converting with a relatively high efficiency substantial portions of liquid carbon dioxide stored at room temperature into frozen carbon dioxide in small quantities.

These and other related objectives of this invention are realized by providing a portable apparatus for converting a portion of received liquid carbon dioxide to solid carbon dioxide, the apparatus comprising:

an elongate stiff tube having first and second ends, said first end being formed to quickly connect with an outlet of a liquid carbon dioxide source to be supported solely thereby;

a process control valve having an inlet and an outlet, said valve inlet being connected to said second end of said tube whereby said process control valve is supported solely by said tube;

an expansion nozzle having an inlet of a predetermined small cross-sectional area and an outlet having a larger cross-sectional area and a smooth internal surface defining an expansion path therebetween, said expansion nozzle being supported solely by connection with said process control valve outlet; and a foraminous bag connected at an inlet end to said expansion nozzle outlet and having a closable outlet end.

In another aspect of the invention, there is provided a method for forming solid carbon dioxide received at ambient temperature, comprising the steps of:

controlling a flow of liquid carbon dioxide at ambient temperature and corresponding saturation vapor pressure through a heat exchange coil located within a thermally insulated space;

directing an outflow of liquid carbon dioxide from said heat exchange coil through an expansion nozzle as a quasi-isenthalpic expanding flow, to obtain a rapid drop in temperature thereof and conversion thereby of a portion of the liquid carbon dioxide to solid carbon dioxide and evaporation of non-solidified liquid carbon dioxide into gaseous carbon dioxide at not less than ambient atmospheric pressure; and within said thermally insulated space surrounding said expanding flow out of said nozzle by a foraminous and selectively closable bag to collect the solidified carbon dioxide therein while permitting escape of gaseous carbon dioxide therethrough.

BRIEF DESCRIPTION OF DRAWINGS

The sole figure.

DESCRIPTION OF THE PREFERRED EMBODIMENTS

Figure 1:
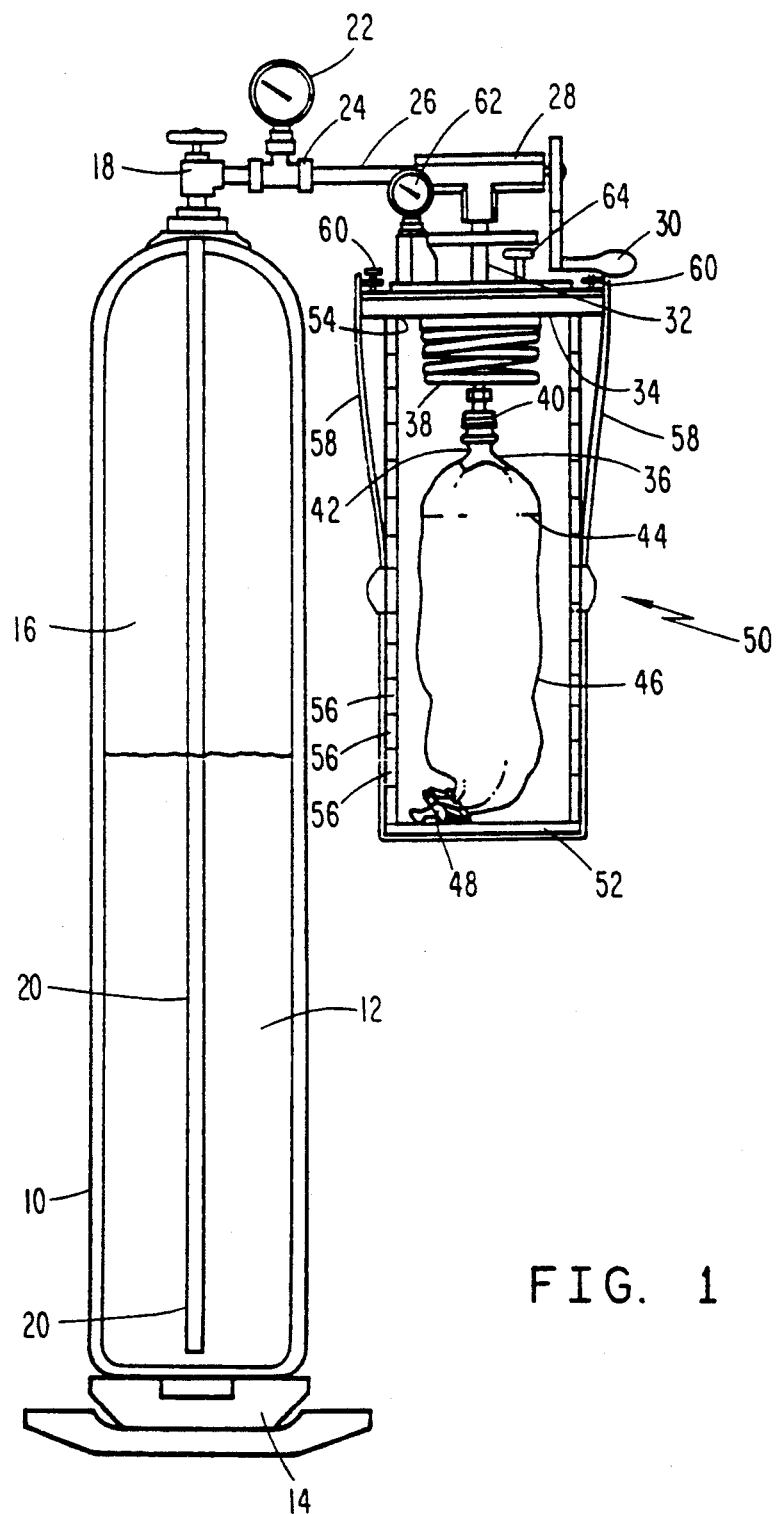
FIG. 1, is a partial vertical cross-sectional view of an assembly including a standard container of liquid carbon dioxide connected to a preferred embodiment of the apparatus of this invention.

An important aspect of the present invention is that it provides relatively inexpensive, light-weight and highly efficient apparatus which is readily connectable to a standard source of liquid carbon dioxide to quickly produce relatively small amounts of solid carbon dioxide therefrom.

As best seen with reference to FIG. 1, a typical standardized cylinder 10 containing a quantity of liquid carbon dioxide 12 is mounted on a base 14 to be disposed upright. Within cylinder 10, above the liquid carbon dioxide 12, there is gaseous carbon dioxide 16 at a saturated vapor pressure corresponding to the ambient temperature.

At the top of the cylinder 10 there is provided a tank valve 18, typically of a type which may be manually operated to permit an outflow of the contents of the tank. With additional suitable fittings, valve 18 may also enable an inflow of additional liquid carbon dioxide from a larger supply source to refill the tank when necessary. Depending downwardly from tank valve 18 is a liquid carbon dioxide pick-up tube 20 which ends close to the bottom surface of tank 10. By this arrangement, due to the pressure of the gaseous carbon dioxide 16, whenever tank valve 18 is opened, liquid carbon dioxide 12 is forced upwardly through tube 20 and out of tank valve 18.

At an ambient temperature of 300° K., i.e., approximately 80.6° F., the saturation vapor pressure of gaseous carbon dioxide over liquid carbon dioxide will be approximately 987 psia. For the convenience of the user, a pressure gauge 22, preferably one capable of measuring pressures of at least 1200 psia, is permanently fitted to an outlet of tank valve 18 by a fitting 24. Fitting 24 has a downstream end which may be threaded or otherwise provided with any known quick-connection features.

The portable apparatus according to the preferred embodiment of the present invention includes a relatively short length of a stiff tube 26 formed at one end to quickly and securely connect to fitting 24 so as to be able to receive liquid carbon dioxide therethrough at a pressure readable on gauge 22 when tank valve 18 is opened. It is important for the present invention, at least in its preferred embodiment, that tube 26 be securely attached to fitting 24 so as to extend in cantilever form, as illustrated in FIG. 1, to provide the sole support for the other components of the apparatus. These components, and the manner in which they interact and coact, will now be described fully.

The distal end of stiff tube 26 is connected to an inlet of a manual process control valve 28 which may preferably be opened in controlled manner by rotation of a crank 30. Note that manual process control valve 28 is supported solely by its connection to cantilevered stiff tube 26. An outflow of the liquid carbon dioxide through manual process control valve 28 flows downwardly through an outlet tube 32.

Securely connected to outlet tube 32, so as to be supported solely thereby, is a head plate 34, which is formed with an opening through which outlet tube 32 extends to convey a controlled flow of liquid carbon dioxide.

In the simplest form of the present invention, an expansion nozzle 36 may be connected directly to the delivery end of outlet tube 32, to receive a high pressure liquid carbon dioxide therefrom at room temperature and to immediately and quickly expand the same in a downward direction.

In another aspect of the invention, as illustrated in FIG. 1, a heat exchange coil 38 may be provided intermediate the outlet end of tube 32 and nozzle 36. The outlet end of heat exchange coil 38 is provided with a quick-connect fitting 40 to which the small cross-sectional area 42 of nozzle 36 may be quickly connected. Nozzle 36 provides a smooth internal surface to promote and guide an expanding flow between nozzle inlet 42 and the larger cross-sectional area nozzle outlet 44. The high pressure liquid carbon dioxide flow thus very rapidly undergoes a significant pressure drop and experiences a very large volumetric expansion and consequential temperature drop. A discussion of realistic values encountered in experimental testing of a prototype device according to this invention is provided below.

Around and to the nozzle outlet 44 is connected an upper end of a foraminous bag 46 which depends from and is supported solely by expansion nozzle 36. Bag 46 may be made of any light flexible material, e.g., cloth, porous paper or a plastic material provided with a plurality of small perforations. The bottom end of foraminous bag 46 is open but may be readily closed by any known closure means. In FIG. 1, such a closure means is illustrated as taking the form of a conventional binder clip 48. The key is that such a closure means should be easy to handle during use.

A thermally insulating cover 50, having the general form of an open ended box has a substantially horizontal base 52 and vertical sides (not numbered for convenience), which end at an upper open end 54. The vertical walls of thermally insulating cover 50 may conveniently be formed of a stack of slabs 56 formed of a foamed plastics material. Such slabs may be formed to rest on top of each other above base 52, and each slab 56 has an opening therethrough which is sufficiently large to comfortably accommodate any of foraminous bag 46, expansion nozzle 36, and heat exchange coil 38. The uppermost open end 54 of the thermally insulating cover 50 thus formed is held against an underneath surface of end plate 34 by attachment means such as a plurality of strap members 58 connectable to head plate 34 by snap fittings 60. The individual slabs 56 are not pressed very hard to enabling slabs and, therefore, a certain amount of leakage of air and/or carbon dioxide from/to the ambient atmosphere is intentionally made possible across the vertical walls of thermally insulating cover 50.

In addition, to satisfy certain operational needs, one or more openings (not shown) may be provided in head plate 34 to allow additional leakage of carbon dioxide therethrough from within the space between the outside of foraminous bag 46 and the volume defined within thermally insulating cover 50 by the side walls and the underneath surface of head plate 34 thereof. To such a deliberately provided opening in head plate 34 there may be fitted a process pressure gauge 62 to enable a user to determine the pressure within thermally insulating cover 50 during use. To another of such openings in head plate 34 there may be fitted a pressure relief valve 64 which may automatically open when the pressure inside thermally insulating cover 50 reaches a predetermined value. Pressure relief valve 64 may be operated by a user to deliberately control such a pressure to a value read on process pressure gauge 62 during use.

Note that, as illustrated in FIG. 1, the entire apparatus according to the preferred embodiment, extending from the quick connect fitting at the inlet end of stiff tube 26, through pressure relief valve 64, is supported solely by the quick-connection between stiff tube 26 and fitting 24 of the liquid carbon dioxide supply tank 10. As persons skilled in the mechanical arts will appreciate, stiff tube 26 may readily be made of steel and the manual process control valve 28, head plate 34, strap members 58, base 52, slabs 56, and the like, may all be substantially made of light-weight plastics material(s). Only certain portions of process pressure gauge 62 and heat exchange coil 38 need to be made of a metal. By suitable choice of materials, therefore, the entire apparatus can be made tough, durable and very light in weight, thus facilitating its portability and handling during repeated fitting and unfitting to and from cylinders containing liquid carbon dioxide.

To use this apparatus, the user simply connects the inlet end of stiff tube 26 to the downstream end of fitting 24, with manual process control valve 28 in its closed position. The user makes sure that the inlet end of expansion nozzle 36 is connected to either outlet tube 32 (in the embodiment omitting a heat exchange coil), or to the outlet end of heat exchange coil 38 (in an embodiment incorporating such a heating coil, as illustrated), and also that thermally insulating cover 50 is properly connected to head plate 34 at snaps 60.

Tank valve 18 is then opened, and the pressure of the gaseous carbon dioxide 16 within carbon dioxide cylinder 10 will ensure that liquid carbon dioxide 12 moves upwardly through tube 20 and tank valve 18 into stiff tube 26 and manual process control valve 28. At this time, the user can read on gauge 22 the actual pressure of the liquid carbon dioxide at ambient temperature as it is available to be converted into solid carbon dioxide.

The user then operates crank 30 to open manual process control valve 28, thereby generating a controlled flow of liquid carbon dioxide to expansion nozzle 36. If the nozzle inlet 42 is about 0.5 in. in diameter, and nozzle outlet 44 is 4 in. in diameter, the area expansion ratio for expansion nozzle 36 will be 64:1. The liquid carbon dioxide will experience a pressure drop from about 987 psia initially to ambient pressure at about 14.7 psia, the inlet-to-outlet pressure ratio across the nozzle thus also being very close to the ratio of the outlet area to the inlet area for expansion nozzle 36. Consequently, although the carbon dioxide flowing through expansion nozzle 36 will experience a phase change from liquid to solid for a first portion and from liquid to gas for a second portion, because of the very large cross-sectional area expansion to this expanding flow, there should not be a significant change in the kinetic energy of the flow through expansion nozzle 36.

Persons of ordinary skill in the art can readily obtain from standard reference handbook, etc., the thermodynamic properties of carbon dioxide at various states of interest, e.g., at room temperature, atmospheric pressure, and the like. Making the usual engineering assumptions, i.e., that the flow through expansion nozzle 36 is very rapid, that the pressure of the non-solidified carbon dioxide leaving nozzle 36 is atmospheric, and that this carbon dioxide gas leaves through the pores of foraminous bag 46 at about room temperature, such a person can determine for theretically quasi-isenthalpic flow what portion of the liquid carbon dioxide will be converted to solid carbon dioxide. Such calculations can be readily performed by persons knowledgeable in thermodynamics, hence for conciseness these are not reproduced here at length. Such calculations would show, however, that for an expansion from liquid carbon dioxide at the pressure of 67 bar and at 300° K. to solid and gaseous carbon dioxide at atmospheric pressure (1 bar) at 195° K., with no heat exchange coil utilized, approximately 24.4% of the supplied liquid carbon dioxide should be turned into solid carbon dioxide and approximately 75.6% should turn into gaseous carbon dioxide.

However, if an efficient heat exchange coil 38 is utilized and there is perfect heat exchange between the gaseous carbon dioxide escaping out of foraminous bag 46 and the liquid carbon dioxide being flowed via the heat exchange coil 38, approximately 33.8% of the supplied liquid carbon dioxide should be expected to turn into solid carbon dioxide and approximately 66.2% should leave the apparatus as gaseous carbon dioxide at 300° K. and atmospheric pressure.

Experiments conducted with a prototype device according to the preferred embodiment (as described hereinabove), repeatedly produced very close to 34% solid carbon dioxide from liquid carbon dioxide supplied at room temperature. The apparatus included a compact monotonically wonld helical heat exchange coil (the exact structure of which may be the basis for a separate patent application), and approximately 1 lb. of solid carbon dioxide was produced in about 20 secs.

Note that with a pressure relief valve 64 provided at head plate 34, it may be desirable to replace the above-discussed structure of stacked foamed plastic slabs by a contiguous insulating structure for the walls of thermally insulating cover 50, since all outflow of gaseous carbon dioxide can be directed controllably through pressure relief valve 64 instead of having the gaseous carbon dioxide leak out from between adjacent foam slabs 56.

Naturally, care must be taken in use to avoid increasing the pressure within thermally insulating cover 50 to a value so high that force exerted due to gaseous carbon dioxide pressure therewithin breaks or damages the strap members 58 and/or snaps 60. However, by monitoring process pressure gauge 62, a user may control and maintain an above-atmospheric pressure around the outside of foraminous bag 46 during use of the apparatus.

In summary, there is described herein a relatively inexpensive, compact, light-weight and easy-to-use apparatus which a user may quickly connect to a standard supply of liquid carbon dioxide and, within a matter of seconds, produce small quantities of solid carbon dioxide for use. It is believed that likely users include operators of emergency medical service vehicles carrying cylinders of liquid carbon dioxide, Coast Guard and other rescue vessels, and the like. Solid carbon dioxide is a well known, highly compact, and relatively inexpensive coolant frequently utilized to maintain body tissues, serums, and assorted biological fluids and samples at low temperatures. Other comparable uses, e.g., for laboratory tests in the field and the like, will no doubt occur to potential users.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A portable apparatus for receiving liquid carbon dioxide at room temperature form a liquid carbon dioxide source and converting a portion thereof to solid carbon dioxide, comprising:
   an elongate stiff tube having first and second ends, said first end being formed to quickly connect at said first end with an outlet of said liquid carbon dioxide source to receive liquid carbon dioxide therefrom;
   a process control valve having an inlet and an outlet, said valve inlet being connected to said second end of said stiff tube to receive liquid carbon dioxide therefrom;
   an expansion nozzle, having an inlet of a predetermined small cross-sectional area and an outlet having a larger cross-sectional area and a smooth internal surface defining an expansion path therebetween, connected at said inlet to said outlet of the valve to receive liquid carbon dioxide therefrom; and
   a foraminous bag connected at an inlet end to said expansion nozzle outlet to receive a flow of carbon dioxide expanded therethrough having a closable outlet end.

2. The portable apparatus according to claim 1, further comprising:
   a head plate mounted to said outlet of the process control valve, said head plate having an aperture to enable flow of liquid carbon dioxide therethrough form the process control valve to the expansion nozzle;
   a heat exchange coil provided intermediate the outlet of said process control valve and said inlet of said expansion nozzle;
   means for releasably closing a lower end of said foraminous bag; and
   thermally insulating cover means disposed for surrounding said foraminous bag, said nozzle and said heat exchange coil when releasably mounted to and underneath said head plate to be supported solely thereby, said cover means having at least one opening to allow leakage therethrough of gaseous carbon dioxide passing through said foraminous bag during use of the apparatus.

3. A portable apparatus for converting a portion of received liquid carbon dioxide to solid carbon dioxide, the apparatus comprising:
   an elongate stiff tube having first and second ends, said first end being formed to quickly connect with an outlet of a liquid carbon dioxide source to be supported solely thereby;
   a process control valve having an inlet and an outlet, said valve inlet being connected to said second end of said tube whereby said process control valve is supported solely by said tube;
   a head plate having a first opening therethrough and connected to said process control valve to be supported substantially horizontally solely thereby;
   a heat exchange coil having an inlet and an outlet, mounted to and underneath said head plate to be supported solely thereby, said coil inlet communicating with said process valve outlet through said first opening in said head plate, said coil having a second end provided with a quick connect element;
   an expansion nozzle having an inlet of a predetermined small cross-sectional area and an outlet having a larger cross-sectional area and a smooth internal surface defining an expansion path therebetween, said expansion nozzle being supported solely by connection with said quick connect element;
   a foraminous bag connected at an upper end to said expansion nozzle outlet to depend downwardly therefrom and having a closable lower end;
   means for releasably closing said lower end of said foraminous bag; and
   thermally insulating cover means for surrounding said foraminous bag, said nozzle and said heat exchange coil when releasably mounted underneath said head plate to be supported solely thereby, said cover means having at least one opening to allow leakage therethrough of gaseous carbon dioxide passing through said foraminous bag during use of the apparatus.

4. The portable apparatus according to claim 3, further comprising:
   first pressure determination means connected to said tube for determining the pressure of a flow of liquid carbon dioxide therethrough.

5. The portable apparatus according to claim 4, further comprising:
   second pressure determination means communicating through said head plate to a space defined thereunder within said cover means for determining a pressure therein.

6. The portable apparatus according to claim 5, wherein:
   said heat exchange coil comprises a length of tubing formed as a compact monotonically wound helix.

7. The portable apparatus according to claim 6, wherein:
   said process control valve is operable manually.

8. The portable apparatus according to claim 7, further comprising:
   pressure relief means mounted to said head plate and supported solely thereby for regulating a pressure in a space defined within said cover means outside of said foraminous bag during use of the apparatus; and
   light-weight attachment means connected to said base supporting said stack for attaching the same to said head plate,
   wherein said pressure relief means maintains a pressure within said cover means at a value above atmospheric pressure during use of the apparatus.

9. The portable apparatus according to claim 3, wherein:
   said heat exchange coil comprises a length of tubing formed as a compact monotonically wound helix.

10. The portable apparatus according to claim 3, wherein:
    said process control valve is operable manually.

11. The portable apparatus according to claim 3, wherein:
    said cover means comprises a foamed plastics material.

12. The portable apparatus according to claim 11, wherein:
    said foamed plastics material comprises a loose stack of flat slabs, each with an aperture of a size sufficient to accommodate said foraminous bag, said nozzle and said heat exchange coil therethrough, said stack resting on a base and during use of the apparatus permitting leakage of gaseous carbon dioxide between adjacent slabs.

13. The portable apparatus according to claim 12, further comprising:

light-weight attachment means connected to said base supporting said stack for attaching the same to said head plate.

14. The portable apparatus according to claim 3, further comprising:

pressure relief means mounted to said head plate and supported solely thereby for regulating a pressure in a space defined within said cover means outside of said foraminous bag during use of the apparatus.

15. A method of forming solid carbon dioxide from liquid carbon dioxide received at ambient temperature, comprising the steps of:

controlling a flow of liquid carbon dioxide at ambient temperature and corresponding saturation vapor pressure through a heat exchange coil located within a thermally insulated space;

directing an outflow of liquid carbon dioxide from said heat exchange coil through an expansion nozzle as a quasi-isenthalpic expanding flow, to obtain a rapid drop in temperature thereof and conversion thereby of a portion of the liquid carbon dioxide to solid carbon dioxide and evaporation of non-solidified liquid carbon dioxide into gaseous carbon dioxide at not less than ambient atmospheric pressure; and within said thermally insulated space surrounding said expanding flow out of said nozzle by a foraminous and selectively closable bag to collect the solidified carbon dioxide therein while permitting escape of gaseous carbon dioxide therethrough.

16. The method according to claim 15, comprising the further step of:

directing said escaping gaseous carbon dioxide to said heat exchange coil to effect cooling of liquid carbon dioxide flowing therethrough.

17. The method according to claim 16, comprising the step of:

controlling an outflow of gaseous carbon dioxide from said thermally insulated space to maintain a pressure therein at an above-atmospheric level.

18. A portable apparatus for converting a portion of received liquid carbon dioxide to solid carbon dioxide, the apparatus comprising:

an elongate stiff tube having first and second ends, said first end being formed to quickly connect with an outlet of a liquid carbon dioxide source to be supported solely thereby;

a process control valve having an inlet and an outlet, said valve inlet being connected to said second end of said tube whereby said process control valve is supported solely by said tube;

an expansion nozzle having an inlet of a predetermined small cross-sectional area and an outlet having a larger cross-sectional area and a smooth internal surface defining an expansion path therebetween, said expansion nozzle being supported solely by connection with said process control valve outlet; and a foraminous bag connected at an inlet end to said expansion nozzle outlet and having a closable outlet end.

* * * * *